Figure 5:
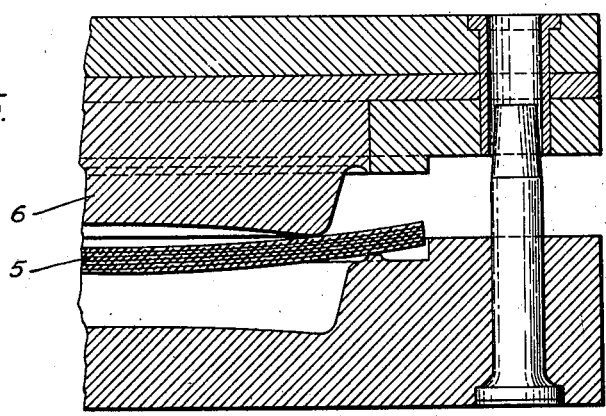

May 26, 1936.  N. S. CLAY  2,042,210
COMPOSITION TRAY
Filed Nov. 11, 1931  2 Sheets-Sheet 1
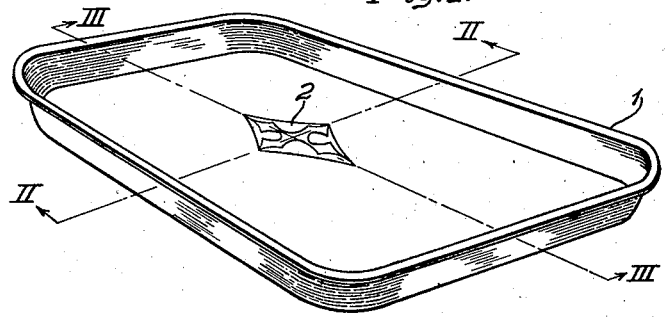
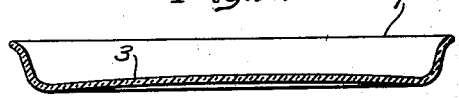
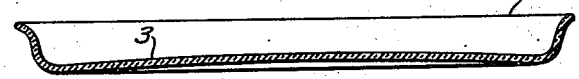
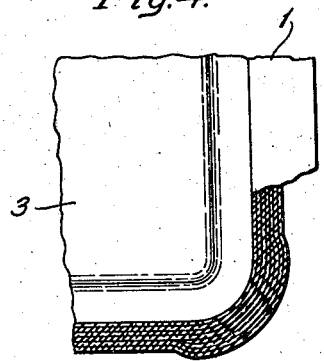
WITNESSES:
INVENTOR
Noble S. Clay.
BY
ATTORNEY May 26, 1936.  N. S. CLAY  2,042,210
COMPOSITION TRAY
Filed Nov. 11, 1931   2 Sheets-Sheet 2

WITNESSES:

INVENTOR
Noble S. Clay.
BY
ATTORNEY

Patented May 26, 1936

2,042,210

UNITED STATES PATENT OFFICE 2,042,210

COMPOSITION TRAY

Noble S. Clay, Wilkinsburg, Pa., assignor to Westinghouse Electric & Manufacturing Company, a corporation of Pennsylvania Application November 11, 1931, Serial No. 574,335

4 Claims. (Cl. 65—53)

This invention relates to improvements in trays of composite material impregnated with a heat-hardening resinous binder, and more particularly to molded laminated trays of fibrous sheets and a heat-hardening resinous binder that is adapted to withstand severe usage, as in cafeteria service.

Composite trays are manufactured by molding fibrous base material or laminations of fibrous sheets, treated with heat hardening resin, so as to shape the tray under high pressure at elevated temperature and to consolidate the structural elements. Resins that are especially adapted to this purpose are obtained by chemical condensation between various reagents, of which considerable numbers are known to be suitable, such as aldehyde and phenol. The condensation reactions are arrested at intermediate stages, at which the resins are capable of being coated on sheet material and capable at elevated temperature of penetrating between the fibers of paper or cloth sheets with additional heating. The arrested chemical condensation proceeds so as to harden the resin permanently throughout the fibres.

As such trays come from the mold, they are of hard smooth surface that does not retain dirt and grease as easily as does metal and does not tarnish like metal. Frequently the trays are of decorative appearance by reason of designs applied to the surface. Although such qualities promote the use of resinous trays, various defects incorporated during the course of manufacture have militated against the desired extension of their use.

Unsatisfactory trays result frequently from warping as the article is taken from the heated molds in which it was formed. This warping is a result of the high rate of contraction of the resin on cooling. Many of the resins ordinarily used have a higher thermal coefficient of expansion than do many metals and even change volume at as great a rate as does brass. Consequently, cooling strains are set up between the resin and the accompanying fibrous base of a tray and also are set up internally of the resin itself, so that inevitably many trays warp after molding. Largely, this occurs before the trays are approved by the manufacturer, but often the defect is hidden and does not become apparent until after a purchaser has placed the tray in use. In any event considerable waste is entailed. Its prevention has defied the greatest care in production methods.

Warped trays are unsatisfactory, not only in appearance and in difficulty to stack in quantities, but also because often the bottoms bulge so that on a flat surface the tray spins or rocks and spills its contents.

Another condition that detracts from the usefulness of laminated resinous trays arises from the extremely high pressures to which they are subjected in molding. Usually one or two tons per square inch are imposed to form the trays. Since this pressure is transmitted to the fibrous sheets while the resin is fluid in the heated mold, differences of thickness in the several lamina lead to areas that are relatively bare of resin. These may constitute hidden potential weaknesses or they may exhibit themselves as unsightly marks in the surface of the tray. For example, this latter is wound where inlay or appliqué decorative pieces are impressed against a limited area of the surface so as to entail differences of thickness. Also, in areas where bending of the fibers is particularly severe and where extrusion of resin from the fibers is especially pronounced, weaknesses develop. The corners and bottom edges, for example, often exhibit bursting of their composite structure.

Many defects of this sort are brought out by the severe treatment to which trays are put in cafeterias and similar establishments. Weaknesses develop particularly on repeated washing of trays in hot water that is strongly alkaline from soap or soda detergents. The absorption of such corrosive liquid is facilitated by the presence of incipient cracks and becomes apparent in weakening of the fibers to such an extent that many trays warp and become pitted and chipped as the number of washings increase. Representative tests have shown that as high as nine out of ten trays that were commercially acceptable at first became warped after only a thousand washings.

In view of these imperfections, it is among the objects of this invention to manufacture a composite resinous tray in which the strains induced under the heat and high pressure of molding are overcome, so that the utility of the tray is relatively long-lived, even under severe conditions of commercial use.

I have discovered that these objects, and others, are accomplished by counteracting molding strains through improved conformation of the composition trays. Preferably, this invention comprises a tray in which the bottom is bowed upward slightly in molding. This, it is found, neutralizes contraction on cooling, keeps the tray from warping, and by strengthening the surface layers minimizes the development of incipient cracks.

A further embodiment of this invention supplements the advantage of bowing the bottom of the tray by increasing the volume of resin at the lower marginal areas, such as the lower corners of the tray. Thus in those areas, fibers of the cloth or paper sheets are relieved from tendencies to crush and tear as they are bent under the extremely high pressure of molding. Also in trays having an inlay surface, this invention comprises an additional corrective factor in that interior laminations of complementary outline to the inlay are arranged with an opening in registry therewith, to counteract differences of thicknesses due to the inlay. Thus if a square inlay is cut from a larger sheet and applied to the surface of the tray, the differences in thicknesses are counteracted by arranging the larger sheet as an interior lamina with its square opening under the inlay. In this way, pressure in molding is equalized and the fluid resin is distributed more uniformly. Consequently, on cooling, the benefits of bowing the bottom of the tray are augmented by a more uniform contraction of the laminated structure.

By way of specific illustration, reference is made to the accompanying drawings in which preferred embodiments of this invention are shown.

Figure 6:
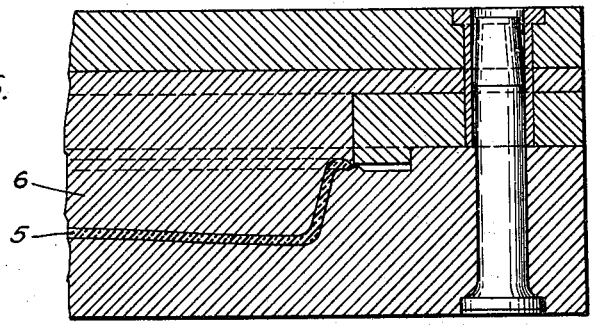
Figure 7:
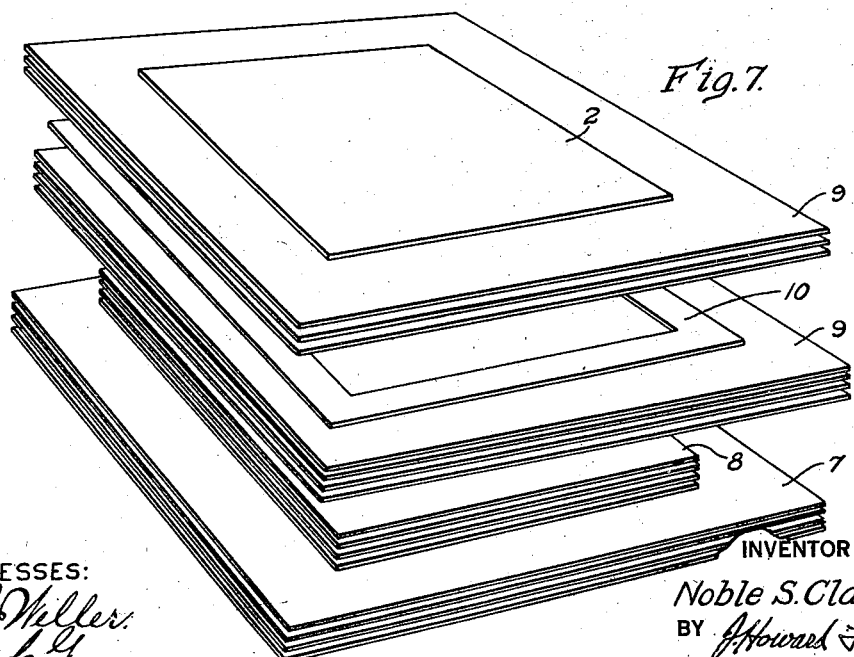

In the drawings:

Figure 1 is a perspective view of a laminated resinous tray having an inlay surface ornamentation, Fig. 2 is a sectional view taken along the line II—II of Fig. 1, showing a tray bowed across the bottom, Fig. 3 is a sectional view taken along the line III—III of Fig. 1, showing the bottom of a tray bowed longitudinally, Fig. 4 is an enlarged detail sectional view through a corner of a tray, showing the increased volume of material provided in an area where maximum bending of the fibers occurs, Figs. 5 and 6 are sections through a mold containing resin-impregnated laminations for producing trays according to this invention, with the mold respectively in open and closed positions, Fig. 7 is an exploded perspective view of sheets of resin-treated material as they are assembled preparatory to molding a tray, and showing a rectangular surface inlay sheet in registry with the opening of a complementary inner rectangular sheet from which it was cut.

Referring more particularly to the drawings, a laminated resinous tray 1 is shown having a surface inlay element 2. The bottom 3 of this tray is bowed upwardly to a slight extent as shown in Figs. 2 and 3, for example, approximately $\frac{1}{32}$ of an inch. In preferred practice, this bowing occurs from the entire margin of the tray bottom, but in some cases it is acceptable to bow the tray substantially in one direction only. This conformation results from the form of the mold. Its effect is to increase the strength of the bottom of the tray as contraction occurs during cooling, and to counteract tendencies to impairment of the surface material, and to distribute stresses and relieve internal strains, so that warping of the sides and bulging of the bottom is obviated.

In molding the corners, the bottoms of the trays are permitted by suitable spacing between the male and female portions of the die to acquire increased wall thickness as shown in Fig. 4. In some instances inserts 11 such as shown in Fig. 4 are provided. By providing increased space in this area where there is maximum bending in the fibrous laminations, the fibers become surrounded by greater amounts of fluid resin and thus are relieved somewhat from destruction. Also, on cooling, greater strength is provided for withstanding and transmitting stresses between the bottom and the side walls. Also, additional mechanical strength is imparted against shocks to which the corners are subjected as the trays are handled in use.

As shown by Figs. 5 and 6, trays are formed by placing a laminated structure 5 of fibrous sheets and heat-hardening resin in a mold 6 and then compressing the structure to appropriate form, as the material is heated to cause the resin to flow. Thus the structure is condensed to a permanently hard condition.

In order to prevent distinguishable areas of relatively low resin concentration resulting from inequalities of pressure during molding, where an inlay surface sheet is applied, a suitable arrangement of laminations preparatory to molding is provided as shown in the exploded view of Fig. 7. This structure is built up of several superposed sheets 7 of resin-treated paper or cloth, of size and character suitable to form the exterior of the tray. As shown, sheets 7 are suitable to extend continuously across the bottom and into the side walls. Upon these are placed smaller sheets 8 commensurate with the bottom of the tray with additional intermediate layers 9 as desired. At an intermediate portion of the structure, a sheet 10 is placed with an opening in registry with the inlay sheet 2 to fill out its contour in complementary manner so that the total thickness of the composite structure through the inlay and adjoining area is uniform throughout. Preferably, this is accomplished by utilizing as the interior lamina a sheet from which the inlay has been taken. This acceptably assures substantially the same quality and thickness of material as is imposed by the inlay on the outer surface. On consolidation in the mold, a substantially uniform structure is attained.

Reference is made to applicant's copending application Serial No. 278,513, issued as Patent No. 1,912,931.

According to the provisions of the patent statutes, I have explained the principle and mode of accomplishing the benefits of my invention and have described what I now consider to represent its best embodiment. However, I desire to have it understood, that the invention may be practiced in other ways than as specifically described within the scope of the appended claims.

I claim as my invention:

1. A molded tray of laminated structure comprising superposed fibrous sheets and heat-hardening resin, a portion of the surface containing an inlay sheet, the tray being of uniform thickness throughout the inlay and adjoining area.

2. A molded tray of laminated structure comprising superposed fibrous sheets and heat-hardening resin, a portion of the surface containing an inlay sheet and the interior of the structure containing a sheet having an opening of similar outline to the inlay and in registry therewith to equalize the thickness throughout the inlay and adjoining area.

3. A molded tray of laminated structure comprising superposed fibrous sheets and heat-hardening resin, a portion of the surface containing an inlay sheet and the interior of the structure containing a sheet having an opening of similar outline to the inlay and in registry therewith to equalize the thickness throughout the inlay and adjoining area, and the bottom of the tray being bowed inwardly to a slight extent, for counteracting tendencies of the tray to warp.

4. A molded tray of laminated structure comprising superposed fibrous sheets and heat-hardening resin, a portion of the surface containing an inlay sheet and the interior of the structure containing a sheet having an opening of the same outline and in registry with the inlay to equalize the thickness throughout the inlay and adjoining area, the lower corners of the tray being of relatively greater thickness than the adjoining walls and the bottom of the tray being bowed inwardly slightly for counteracting tendencies of the tray to warp.

NOBLE S. CLAY.